Dec. 6, 1955  F. A. BIRIBAUER ET AL  2,726,199
HYDRODESULFURIZATION OF OXO ALCOHOLS
Filed Aug. 1, 1950
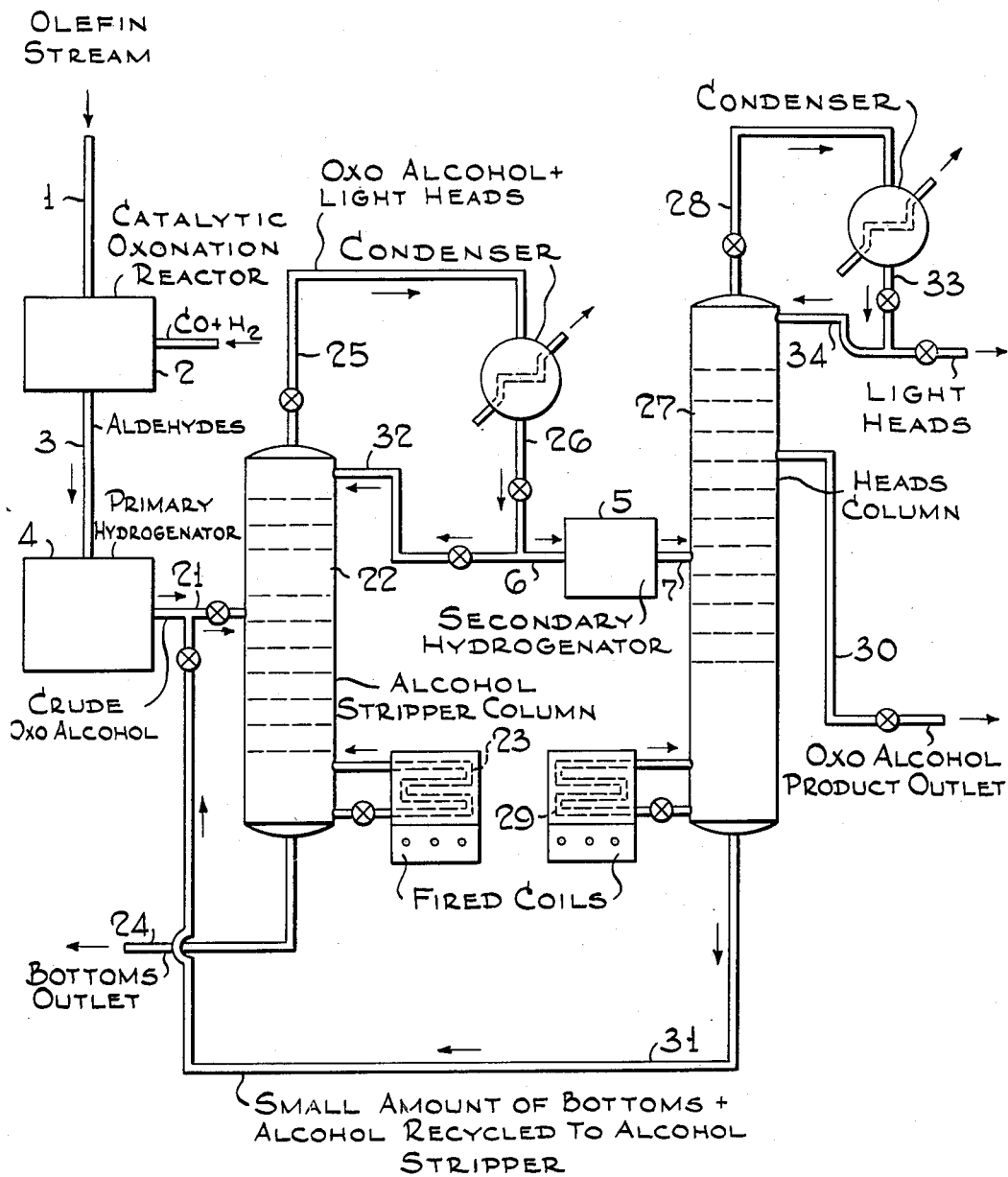
Frank A. Biribauer
John H. Staib
Joseph K. Mertzweiller   Inventors
By Henry Berk   Attorney

United States Patent Office 2,726,199
Patented Dec. 6, 1955

2,726,199

HYDRODESULFURIZATION OF OXO ALCOHOLS

Frank A. Biribauer, Cranford, and John H. Staib, Scotch Plains, N. J., and Joseph K. Mertzweiller, Baton Rouge, La., assignors to Esso Research and Engineering Company, a corporation of Delaware Application August 1, 1950, Serial No. 176,998

8 Claims. (Cl. 202—57)

The present invention relates to a process for distilling and purifying oxygenated organic compounds prepared by the so-called Oxo reaction. The Oxo reaction consists in contacting carbon monoxide and hydrogen with olefinic hydrocarbons in the presence of a carbonylation catalyst. The aldehyde products so obtained are thereafter subjected to catalytic hydrogenation. More specifically, the invention relates to an improved method for purification of primary Oxo alcohols, that is, alcohols prepared by the Oxo reaction, and, specifically, octyl alcohols, by carrying out at least a further hydrogenation, the second hydrogenation preferably with a sulfur-sensitive catalyst and in conjunction with a specific type of distillation of the alcohol. This method has been found to be especially useful for improving the color and odor both of the alcohol and of the esters prepared from the alcohols thus treated and is effective for reducing the sulfur content of the alcohol products made by the synthetic Oxo reactions.

Primary alcohols prepared by the Oxo process are of great economic importance and of commercial interest because of their use as intermediates in the manufacture of plasticizers of the diester type by esterification with dibasic acids. Previously, these alcohols have been supplied mainly by such comparatively costly procedures as aldol condensation of butyraldehydes, followed by dehydration and hydrogenation of the resulting unsaturated octyl aldehyde.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes, ketones, and acids having one carbon atom more per molecule than the olefinic feed material together with some condensed higher molecular weight products such as ethers, acetals, hemiacetals, and esters. The carbonyl compounds which predominate in the product are then subjected to a single hydrogenation to produce the corresponding alcohols, usually in a rather impure state.

Practically all types of organic compounds having an olefinic double bond may be used as starting materials to the first or oxonation stage, including aliphatic olefins and diolefins, cyclo-olefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt and iron. Suitable general reaction conditions include temperatures of about 150°–450° F., pressures of about 100 to 300 atm., $H_2:CO$ ratios of about 0.5–4.0:1, liquid feed rates of about 0.2–5 v./v./hr. and gas feed rates of about 1,000–45,000 standard cu. ft. of $H_2+CO$ per barrel of liquid olefinic feed.

The primary hydrogenation stage may be operated at conventional hydrogenation conditions which include temperatures, pressure, gas and liquid feed rates approximately within the ranges specified above for the first stage. Various known types of hydrogenation catalysts, including nickel, tungsten, molybdenum, but preferably in the form of their oxides and sulfides, and others may be used. The liquid product from the primary hydrogenation stage is worked up by distillation to separate the desired alcohols from unconverted olefinic feed material, unhydrogenated carbonyl compounds, and hydrocarbons formed in the process. The sulfide catalysts have been found to be especially useful for carrying out this hydrogenation.

The over-all carbonylation or so-called "Oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light-colored or colorless plastics and resins.

Serious difficulties have been encountered in the primary hydrogenation stage as a result of sulfur poisoning of certain hydrogenation catalysts, when the catalysts used are those such as elementary nickel and others which are sulfur-sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages for reducing the carbonyl compounds. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Sulfur which is present in the crude reaction mixture containing the carbonyl compounds tends to be carried through the oxonation stage into the hydrogenation stage where it combines with the hydrogenation catalyst to diminish and even completely destroy catalyst activity unless sulfur-insensitive catalysts are used. The sulfur-sensitive hydrogenation catalysts are generally of the elementary metallic type and the deactivating effect of the sulfur on their activity requires frequent reactivation, catalyst replacement, and increased amounts of a catalyst whose cost is definitely a commercial factor and may be prohibitively high. Thus, it has been considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide, tungsten sulfide, and mixtures thereof. While these catalysts have the decided advantage of avoiding the inactivation due to sulfur content of the feed stock, they also possess the disadvantage of permitting much of the sulfur to pass unchanged through the hydrogenation zone and, indeed, in many instances, tend to introduce additional sulfur contamination into the alcohol. Thus, the final crude alcohol may have a total sulfur content from 30 to 100 p. p. m., or in some cases, an even higher value if no sulfur clean-up operations are carried out.

If a crude fraction of isooctyl alcohol as produced by the oxonation of $C_7$ olefins, followed by a single hydrogenation, is distilled either in a batch or continuous manner and cuts removed according to increasing boiling point, then it is possible to obtain the following fractions:

1. A light heads fraction containing unconverted olefin hydrocarbons, saturated hydrocarbons, and unhydrogenated aldehydes.

2. A middle fraction containing principally isooctyl alcohol contaminated with reaction products and decomposition products such as aldols, hemi-acetals, acetals, ketals, esters, ethers, and the like, which result from side reactions taken place during the Oxo process and in the distillation.

3. A bottoms fraction containing higher-boiling materials including esters and unsaturates of low volatility, higher alcohols, decomposition products of the acetals and undecomposed high-boiling acetals, ethers, and ketals.

It can readily be seen that the product from the primary hydrogenation, while predominantly Oxo alcohol, also contains a wide range of other impurities which must be separated from the desired alcohol, preferably by at least one distallation. Care must be exercised in prolonged heating and/or distillation of the Oxo alcohols in order to avoid loss of product by decomposition to valueless and, perhaps, harmful by-products. All of the fractions obtained by such a distillation will inevitably contain organically bound sulfur impurities in cases where initial reactants and reagents contain sulfur in any form and especially where the hydrogenation of the aldehyde product is carried out over a sulfur-insensitive catalyst.

One of the largest and most important uses developed for the synthetic alcohol products is that of producing esters suitable for plasticizers, by reaction with aliphatic, alicyclic, and aromatic acids or anhydrides, including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols from $C_4$ to $C_{20}$ range such as the butyl alcohols, the octanols, and nonanols.

These esters are prepared in standard type esterification equipment employing reactors made of stainless steel or other metal, or, in some cases, in glass-lined reaction vessels. In some instances, particularly when the esters were produced in reactors having metallic surfaces exposed to the reacting mixtures, the products were found to be deficient as to the standards required for plasticizers, in such characteristic as odor, color, and plasticizing qualities such as the poor weathering tendency of the resins and plastics in which such plasticizers are used. These undesirable characteristics are believed to be primarily caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near five parts per million, although somewhat higher total sulfur concentrations can be tolerated, the exact limit of tolerance depending upon the form in which the sulfur occurs.

In general, the sulfur in the synthetic Oxo alcohols is in the form of organically combined sulfur. Although all types of organic impurities in which the sulfur occurs have not been fully determined, it is believed that the sulfur is present in a variety of forms and that it is generally deleterious in most forms when occurring in the final alcohol. Sulfur-containing contaminants cause both odor and color problems as well as act as accelerators to give unwanted properties to the alcohols. The finished alcohol should contain a minimum of sulfur-containing compounds. It is also the best practice to remove most of the carbonyl compounds and potential carbonyl compounds to obtain alcohols which give ester plasticizers of acceptable quality. These purifications are especially necessary if the ester is manufactured in stainless steel equipment and unreacted or excess alcohol is recycled to the esterification zone. A number of types of sulfur-containing impurities are believed to be present and among those probable in an isooctyl alcohol product prepared from a $C_7$ olefin, are isooctyl mercaptan, isooctyl sulfide, diethyl sulfide, diethyl disulfide, dipropyl sulfide, dipropyl disulfide, butyl sulfide, as well as the corresponding sulfinic acids, sulfonic acids, sulfoxides and sulfones.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials, including sulfur-containing impurities, have the opportunity to build up during the recycle stages to a point at which they must be purged from the system before continuing the recycling operation. This presents impurity problems which occur even though the actual reaction is carried out in corrosion-resistant or glass-lined equipment.

There are regularly used a number of modified esterification procedures. Two of the main ones which are widely used for preparation of the dioctyl phthalate ester include the high temperature method in which the one mole of phthalic anhydride is heated with approximately 2 to 2.4 moles of octyl alcohol with no catalyst present and the catalytic method employing an acid as catalyzing agent. In one such method, the ester is recovered by distilling, first, the unreacted alcohol and anhydride, then finally, if it is so desired, by distilling the ester under reduced pressure. It is preferred to use the ester without distilling it, and this can be done if the alcohol used in the esterification is of sufficient purity. Although a number of finishing techniques are used for the ester, in all cases unreacted alcohol is distilled off for recycle. The catalytic method in which benzene sulfonic acid or a similar type material is used as a catalyst may be employed to give catalytic esterification at a lower temperature. The highly purified isooctyl alcohol products, such as those made from alcohol purified through the borate ester or prepared over a sulfur-sensitive metallic primary hydrogenation catalyst, show practically no color degradation in any method of esterification. Such refined methods of production are, however, prohibitively expensive for large scale commercial production. The ester color can be expressed in a number of ways, for instance, in terms of color absorbency of the ester at a standard wave length of light, a high value indicating a darkened, low quality ester product. The wave length used for studying the diisooctyl phthalate ester is 4470 A.

In order to test the effectiveness of a treatment for removing sulfur and sulfur-containing impurities from Oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic strips, the standard esterifications being done in glass type reactors. The strips preferably used and those which give the most reproducible results are of the stainless steel type. This test is considered to be the most rigorous and gives the most complete test of alcohol quality.

This invention depends on the discovery that it is possible to process Oxo alcohols by a combination distillation and hydrodesulfurization method by which both lower and higher boiling fractions can be separated from the desired alcohol, and by which the undesirable impurities, including both sulfur-containing and oxygenated products other than alcohols, can be removed or converted to harmless impurities. Briefly, this process includes an initial distillation of the crude Oxo alcohol product obtained from the primary hydrogenating zone, a second hydrogenation of the Oxo alcohol and light heads distillate fractions from the initial distillation, and finally a distillation in which resulting light heads are removed as an overhead stream and the purified Oxo alcohol product is removed as a side stream or intermediate fraction. Since the principal objective is the removal of sulfur-containing impurities, it is very important that the hydrogenation catalyst employed in the secondary hydrogenating zone should be one of the type selected from the sulfur-sensitive class of such catalysts, thus insuring the removal of sulfur during the secondary hydrogenation.

This hydrodesulfurization process can be used for the purification of alcohols containing sulfur impurities, particularly for the purification of Oxo alcohols and is especially applicable to the treatment of alcohols having from four to twenty carbon atoms. It finds particular application in the purification of alcohols obtained by the Oxo reaction and having eight to nine carbon atoms, such alcohols being especially well-adapted for use in the preparation of organic ester plasticizers. The process is further best adapted for use in treating and desulfurizing an Oxo alcohol prepared from sulfur-containing feeds and/or other reactants and alcohols which are obtained by hydrogenation of reducible oxygenated products using a sulfur-insensitive catalyst, for instance, nickel-tungsten sulfide or molybdenum sulfide. Such sulfur-insensitive catalysts are not capable of removing appreciable quantities of sulfur from alcohol products prepared in their presence and may, in fact, introduce additional sulfur into the hydrogenated products.

Although the present process of using hydrodesulfurization may be applied generally to either crude or finished alcohol and may use either a sulfide or a sulfur-sensitive catalyst in the first stage, the process is most useful when carried out in conjunction with a specific type of distillation, i. e., with an initial stage distillation prior to the hydrodesulfurization, and a distillation subsequent thereto.

In the initial or first distillation stage, there is carried out a vaporization of a liquid crude alcohol mixture or condensed product from the primary hydrogenator. This crude alcohol mixture, free of normally gaseous compounds (such as $H_2$, $H_2S$, and $C_1$ to $C_3$ hydrocarbons), includes the light heads fraction containing higher boiling olefin, saturated hydrocarbons, and unhydrogenated aldehydes, the alcohol fraction which may be contaminated with decomposition products boiling within the alcohol boiling range, and the higher boiling materials including the esters, acetals, ethers, and ketals, as well as high molecular weight polymerized products produced during the Oxo reaction. This vaporization may be done in any type of conventional distillation column. The bottoms temperature maintained within the column should be sufficiently elevated to cause at least a partial decomposition of heat unstable impurities in order to release a major portion of the combined alcohol and thereby give more efficient recovery of the desired alcohol product. Thus, the bottoms should be kept above the normal boiling point of the alcohol. Although the amount of material taken overhead as compared to the amount of bottoms allowed to remain in the still, will depend upon degree of decomposition of bottoms and on the composition of the impurities, the column should be operated such that all of the light heads, that is, material boiling below the Oxo alcohol, and substantially all the Oxo alcohol itself, are passed overhead as a vapor stream from the first distillation stage. Thus, in the case of isooctyl alcohol, the overhead temperature should be approximately 170°–185° C. Obviously, the bottoms temperature will be somewhat higher and may be considerably in excess of this temperature. The high-boiling undecomposed bottoms are removed from the lower portion of the column and may be subjected to further cracking or may be employed as such or for the preparation of chemical derivatives, if desired.

The overhead stream from this first distillation stage containing the light heads and the major portion of the Oxo alcohol is then condensed and subsequently subjected to the secondary hydrogenation or hydrodesulfurization stage of the process. This hydrogenation is carried out in the presence of a sulfur-sensitive catalyst as, for example, nickel, copper, or cobalt metals which have been suitably prepared for use as hydrogenating catalysts. These metals are used in a finely-divided form to present a large contact surface as in Raney nickel or UOP nickel catalyst, advantageously employed in this step. Good sulfur sensitivity of the catalyst is of primary importance and catalysts which have substantially no hydrogenating activity to produce alcohols themselves can be employed in this step with good results.

However, for successful operation of the process, it is of primary importance that certain critical precautions be taken in preparing the alcohol prior to subjecting it to a second hydrogenation. Thus, a preliminary fractionation is essential in order to minimize the sulfur content, and precautions should be taken during the actual alcohol preparation to avoid use of sulfur-containing feed streams. An initial distillation serves to reject a considerable amount of high-boiling bottoms containing organically bound sulfur. An upper limit of 40–50 p. p. m. of sulfur can be tolerated in the desulfurization stage.

Following the secondary hydrogenation of the alcohol and the light heads in which the unsaturated materials present in the overhead from the first distillation are more or less completely hydrogenated and the sulfur contained in the alcohol is essentially removed by the sulfur-sensitive catalyst, the product is passed into a second distillation stage such as a fractionation column. In this column, all the lower-boiling materials making up the light heads fraction are removed overhead. This overhead product will include any decomposition products and residual unsaturated material boiling below the alcohol product. In order to obtain the desired purified alcohol from the second vaporization zone in the most advantageous manner, the product is removed as a side stream. From a lower portion of this secondary column, there will be obtained a small amount of bottoms together with residual portions of alcohol which may, if desired, be recycled to the first fractionation column.

By this procedure, it is possible to obtain a high quality alcohol product relatively free of sulfur-containing impurities as well as other color-forming bodies. It is highly desirable to maintain as low a bottoms temperature in the second vaporization stage as possible and, preferably, it is best to maintain a temperature appreciably lower than the upper limit of the boiling range of the alcohol itself. One convenient way by which such a temperature may be maintained is to permit a certain small amount of alcohol to remain in the still bottoms in the second column. Preferably, the distillations of both the first and second stages employed in conjunction with the secondary hydrogenation should be carried out in continuous fashion, although batch type operations are also possible.

Certain precautions and critical conditions should be observed for obtaining best results by the secondary hydrogenation. For instance, when employing a UOP nickel catalyst in order to improve the quality of isooctyl alcohol and using a so-called finished alcohol, it was found that one difficulty encountered was that of overhydrogenation resulting in an appreciable loss of alcohol by decomposition in the secondary hydrogenation zone. The crude alcohol feeds contain appreciably larger quantities of sulfur as well as other impurities than do the corresponding finished alcohols and will, therefore, place a greater burden on the desulfurization catalyst. To a certain degree, overhydrogenation can be controlled by reducing the severity of operating conditions. Thus, the over-all operating conditions of the secondary hydrogenation will be governed in a general way by the content of sulfur which it is desired to remove as well as by the high-boiling impurities present in the feed to the second hydrogenation zone.

Since the second hydrogenation employs a catalyst such as nickel which shows sensitivity to carbon monoxide, it has been found best to employ methanized hydrogen in the secondary hydrogenation. In typical continuous operations, the desulfurization is carried out at 100 p. s. i. g. pressure with a hydrogen rate of 130 cu. ft. of methanized hydrogen per barrel of alcohol feed and at liquid feed rates of both 1 and 4 v./v./hr. Temperatures in the range of 255°–300° F. were used. Quality improvement of the alcohol was measured both by the ester color as determined from the absorbency of light of the phthalate ester, and by the sulfur content of the alcohol product. It was found that sulfur removal was satisfactory at 1 v./v./hr. (0–3 p. p. m. sulfur in product) but was much less complete at 4 v./v./hr. (3–8 p. p. m. sulfur in product) with the initial feeds containing 5–16 p. p. m. total sulfur. These alcohol feeds before being subjected to desulfurization had ester colors of 0.09–0.15. The products resulting from desulfurization operations at 1 v./v./hr. showed ester colors of 0.02–0.05 and at 4 v./v./hr. the colors were 0.04–0.08.

Overhydrogenation was studied by measurement of the initial boiling point of the desulfurized alcohols. At 1 v./v./hr. the initial boiling point of the desulfurized alcohols was decreased by 5°–8° F., but a lesser effect was shown at 4 v./v./hr., the maximum decrease in initial boiling point being 2°–4° F. Distillation showed that a maximum of about 0.5% alcohol was consumed by overhydrogenation at the lower feed rate and 0.2–0.4% at the higher feed rate. Overhydrogenation is a condition to be avoided since it is accompanied generally by an increase in water content of the desulfurized alcohol. After a typical continuous run of approximately 600 hours, a UOP nickel catalyst was shown to give good color improvement and sulfur removal, the temperature of operation having been raised to 300° F., thus indicating that catalyst life under these conditions is quite satisfactory for substantially long periods of continuous operation. Good performance was being obtained after about 1400 volumes of feed per volume of catalyst had been treated. Under these conditions, sulfur balance calculations indicated that about 1.5% of the nickel catalyst had been converted to sulfide.

If so desired, pressures other than atmospheric can be employed in either of the distillation stages. Under certain circumstances, the use of subatmospheric pressures in the second stage may be beneficial. In order to obtain higher temperatures and consequently greater cracking of the bottoms during the first distillation, superatmospheric pressures may be employed in this column, thereby facilitating recovery of the organically combined alcohol present in the initial crude alcohol from the primary hydrogenator. Although in both distillation stages it is desirable to effect fractionation by the use of reflux by return of at least a part of the condensed overhead streams to the column, it is considered within the limits of this invention to carry out the initial distillation substantially without reflux as by the use of a simple flashing operation.

Furthermore, when operating in this manner, unsaturated materials which are known to be unwanted contaminants in the alcohol are essentially eliminated. These unsaturated materials include olefin hydrocarbons as well as certain unsaturated carbonyl compounds and higher boiling materials representing potential carbonylic groups. These materials are eliminated either by decomposition to convert certain components to additional recoverable alcohol or by converting color-forming bodies such as alpha-beta unsaturates to non-color-forming bodies. In addition, and most important, the secondary catalytic hydrogenation effects a substantially complete removal of harmful sulfur in the alcohol, giving an essentially sulfur-free alcohol product which can be used to prepare sulfur-free derivatives.

As an example of the slight improvement which ordinary methods give when purifications such as distillations are used, a finished grade Oxo alcohol having an ester color absorbency at 4470 A. of 1.2+, about 58–68 p. p. m. of sulfur, and an acetalization rate of .23, after distillation at atmospheric pressure, taking a 95% heart cut, showed an ester color of 1.0, 33 p. p. m. of sulfur, and an acetalization rate of .082. After a distillation at 10 mm. pressure, a 95% heart cut of alcohol gave an ester color of .86, had 41 p. p. m. of sulfur, and had an acetalization rate of .11. These data indicate that the improvements given by atmospheric or subatmospheric distillation alone are unsatisfactory for Oxo alcohol having sulfur-containing impurities.

The invention may be better understood in conjunction with the following examples.

EXAMPLE I

In order to study the effect of double hydrogenations on the quality of isooctyl alcohol, a typical crude Oxo product, prepared by a pilot plant operation in which a $C_7$ olefin stream was subjected to oxonation with carbon monoxide and hydrogen, was subjected to a preliminary hydrogenation under the conditions shown in Table I below. The alcohol thus obtained was thereafter subjected to a secondary hydrogenation as indicated in Table I.

*Table I*

BATCH OPERATION WITH SULFUR-SENSITIVE CATALYSTS IN BOTH STAGES

|  | 1st Hydrogenation | 2nd Hydrogenation |
| --- | --- | --- |
| Apparatus | Shaker Autoclave. | Shaker Autoclave. |
| Catalyst | Nickel on Kieselguhr. | Nickel on Kieselguhr. |
| Concentration, Wt. Percent | 12.5–12.8 | 14.0. |
| Temp., °F | 350 | 400. |
| Time, Hrs | 12 | 12. |
| $H_2$ Pressure, p. s. i. g | 2,700 | 2,700. |
| Alcohol Yield, Wt. Percent (by Distillation) | 56.7–62.5 | 54.3. |

The distilled alcohol from the second hydrogenation showed the following characteristics:

Hydroxyl No _____ 431
Carbonyl No _____ 0
Saponification No _____ 0
Acid No _____ 0
Sulfur, p. p. m _____ 0
Odor _____ Characteristic
Color of ester [1] _____ 0.03

[1] Absorbency at 4470 A. of mixture of esterification of alcohol and phthalic anhydride in the presence of stainless steel filings.

No carbonyl, acid, or ester components could be detected in this high grade Oxo alcohol by chemical tests or by infra-red or ultra-violet spectrophotometry.

EXAMPLE II

In an investigation of low pressure hydrodesulfurization of alcohol using a 300 cc. continuous unit with a UOP nickel catalyst, data were obtained as shown in Table II. The feed used for this series of tests was a finished alcohol having a total sulfur content of 18 p. p. m. and an ester color of 0.47 and representative of a sulfur-insensitive (molybdenum sulfide) catalyst in the primary hydrogenation stage. The run was terminated after a total of 96 hours of operation with four different sets of operating conditions. Temperature employed as 350° F. and the operation was carried out by running the feed in an upflow stream through the hydrogenator.

*Table II*

LOW PRESSURE HYDRODESULFURIZATION OF ISOOCTYL ALCOHOL

| Period | Feed | 1 | 2 | 3 | 4 |
|---|---|---|---|---|---|
| Run, Hours | | 9–16 | 9–16 | 9–16 | 9–16 |
| Pressure, p. s. i. g | | 100 | 100 | 400 | 400 |
| Liquid, v./v./hr | | 1.0 | 1.0 | 1.0 | 2.0 |
| Methanized $H_2$ Rate: | | | | | |
| Std. cu. ft. (a) per bbl | | 7,600 | 716 | 655 | 331 |
| Mols $H_2$/Mol Alcohol | | 9.4 | 0.89 | 0.81 | 0.41 |
| Alcohol Inspection: | | | | | |
| Before Distillation— | | | | | |
| Sulfur, p. p. m | | 0 | 0 | 0 | 0 |
| Hydrocarbons, Wt. Percent (a) | | 4.5 | 3.1 | 6.6 | 3.0 |
| After Distillation (b)— | | | | | |
| Sulfur, p. p. m | 18 | 0 | | 0 | |
| Ester Color (c) | 0.47 | 0.03 | 0.03 | 0.03 | 0.03 |
| Acetalization Rate | | 0.000 | 0.000 | 0.000 | 0.000 |
| Oxidation Rate (d) | | 950 | | 1,125 | | a Excess hydrogen at 32° F. and 760 mm.
b Distillation in 25 mm. column.
c Absorbency at 4,470 A. after esterification in the presence of KA2 stainless steel.
d Minutes for 10 lb. drop.

The data show that this type of operation is very effective in that there is a reduction of sulfur content of the alcohol from 18 to 0 p. p. m. in each of the four periods. The corresponding improvement in ester color, the low acetalization rate, and the relatively low oxidation rate are substantial advantages generally to be obtained in an alcohol of low sulfur content. This acetalization test is a measure of the catalytic effect of certain sulfur compounds to promote acetal formation. The catalytic effect is directly proportional to the rate factor.

EXAMPLE III

Further studies on a continuous operation in which isooctyl alcohol is prepared by the catalytic hydrogenation of an oxonation product using a sulfide catalyst in the initial hydrogenation and a sulfur-sensitive catalyst in the second hydrogenation are shown in Table III below. In these tests, a UOP nickel catalyst was employed in carrying out the second hydrogenation. In each case, there is a marked reduction in sulfur content of the treated alcohol and a substantial improvement in ester color of phthalate ester prepared from the desulfurized alcohol.

EXAMPLE IV

As further evidence of color improvement resulting from hydrodesulfurization, recycle esterification tests were carried out on alcohol which had been subjected to a hydrodesulfurization treatment at 300° F. and 1 v./v./hr. at a catalyst age of 600 hours. The tests involved recycle of the stainless steel filings used in the esterification test and therefore represent severe conditions such as would be encountered in plant esterification operations. The excellent properties of the hydrodesulfurized alcohol are illustrated in Table IV shown below in which the light absorbency of the total phthalate esters prepared from the various recycled alcohols are summarized.

*Table IV*

LIGHT ABSORBENCY AT 4470 A. OF TOTAL PHTHALATE ESTERS

| Ester Product of Hydrodesulfurized Alcohol | Cycle No. | Ester Product of Untreated Alcohol |
|---|---|---|
| 0.03 | 1 | 0.09 |
| 0.04 | 2 | 0.32 |
| 0.07 | 3 | 0.42 |
| 0.07 | 4 | 0.34 |
| 0.08 | 5 | 0.29 |

EXAMPLE V

This example will be described with reference to the accompanying figure. A mixture of octyl aldehydes is prepared by the reaction of a $C_7$ olefin stream with a stream of carbon monoxide and hydrogen in the presence of a suitable oxonation catalyst in catalytic oxonation reactor 2. This stream of mixed octyl aldehydes is passed by line 3 into a primary hydrogenator 4 in which the aldehydes together with various oxonation products are contacted with a sulfur-insensitive hydrogenation catalyst as, for instance, molybdenum sulfide, in appropriate form for effecting catalytic hydrogenation of the aldehydes to alcohols. The crude $C_8$ Oxo alcohol mixture obtained by catalytic hydrogenation in hydrogenator 4 is passed by line 21 into an intermediate point of an alcohol stripper fractionating tower 22 which is preferably operated at atmospheric presure. Column temperature is controlled and heat is added in a suitable manner as, for instance, by fired coil 23. Vapor temperatures of the order of 185° C. are maintained at the upper portion of column 22. As overhead product consisting of substantially all of the $C_8$ alcohol together with certain lower boiling impurities including aldehydic material is removed by line 25. In the lower portion of the column, somewhat higher temperatures are preferably maintained in order to accomplish at least a partial decomposition of the acetals, hemi-acetals, and other thermally unstable impurities which break up to yield additional octyl alcohol. A bottoms product containing small amounts of alcohol together with undecomposed acetals, as well as thermally stable materials such as esters and ethers, is removed

*Table III*

CONTINUOUS OPERATION WITH SULFIDE CATALYST IN FIRST STAGE AND SULFUR-SENSITIVE CATALYST IN SECOND STAGE

| | Feed 1 | A | B | Feed 2 | C | D |
|---|---|---|---|---|---|---|
| Avg. Temp., ° F | | 290 | 290 | | 290 | 300 |
| Liquid, v./v./hr | | 1.0 | 4.0 | | 1.0 | 4.0 |
| Light Ends, Wt. Percent | | 0.46 | 0.33 | | 0.58 | 0.51 |
| Sulfur, p. p. m | 8 | 1–3 | 4 | 5 | 0–3 | 3–4 |
| Ester Color | 0.15 | 0.03–0.05 | 0.06 | 0.09–0.13 | 0.03–0.04 | 0.04–0.08 | from alcohol stripper column 22 by means of bottoms outlet line 24. The overhead product taken out by line 25 which is relatively high in the desired alcohol product is carried by line 25 to a condenser which may be operated to effect either partial or total condensation. Preferably, at least a portion of the condensed Oxo alcohol, together with the light heads, is passed by lines 26 and 32 back to the upper portion of column 22 to serve as reflux in maintaining an appropriate reflux ratio within the column. A substantial portion of the condensed Oxo alcohol plus the light heads from column 22 is passed by lines 26 and 6 into a secondary hydrogenator 5. In secondary hydrogenator 5, the Oxo alcohol and light heads are contacted with a sulfur-sensitive catalyst, such as nickel, which is in a sufficiently finely divided state to effect substantially completely the removal of sulfur content as impurities in the feed as well as effect some hydrogenation of unsaturated material. Sufficient hydrogen is added to insure that hydrodesulfurization of the alcohol proceeds at a satisfactory rate and to substantial completion. From secondary hydrogenator 5, the desulfurized alcohol is passed into an intermediate portion of heads column 27. This column is likewise heated, for instance, by fired coil 29. From column 27, the material boiling below approximately 180° C. is removed as an overhead stream at a relatively high reflux ratio by line 28. This stream is passed to a condenser and at least a part of the condensed liquid is returned to the column 27 as reflux by lines 33 and 34 and at least a part is removed as a light heads fraction. From an intermediate portion of the column, there is removed by line 30 the desired octyl alcohol product having a boiling range of approximately 180°–195° C. This octyl alcohol is a purified product containing substantially or organically bound sulfur and showing low values of carbonyl and saponification number. From the bottom of heads column 27, a small amount of bottoms together with some residual alcohol is removed by line 31 and is recycled back to alcohol stripper column 22 by means of line 21. The temperature throughout column 27 should be maintained as low as possible, including the temperature maintained in the bottoms. The relative proportions of materials removed as the three cuts from column 27 will vary somewhat, depending upon the conditions of operation in column 22, the precise degree of completeness of desulfurization and hydrogenation taking place in hydrogenator 5, the feed stock composition, and the purity of alcohol product desired for removal as a sidestream from heads column 27.

What is claimed is:

1. An improved purification process for the treatment of crude primary Oxo alcohols having from four to twenty carbon atoms and having unstable heat sensitive impurities boiling above the boiling point of said alcohols, which comprises introducing crude alcohol into an initial vaporization zone, maintaining in said zone a bottoms temperature substantially above the boiling point of said alcohol product, removing overhead from said zone a vapor stream rich in alcohol and essentially free of high boiling unstable impurities, passing said vapor stream to a hydrogenation zone, contacting said stream with hydrogen in the presence of a sulfur-sensitive catalyst under conditions including temperatures of from about 255° to about 350° F. and pressures from atmospheric to about 400 p. s. i. g. whereby no significant amount of alcohol is hydrogenated to hydrocarbon and whereby substantially all sulfur impurities are removed, passing said purified alcohol product to a second vaporization and fractionation zone, maintaining in said zone a temperature lower than that in said initial vaporization zone, removing volatile material boiling appreciably below the alcohol product as an overhead stream from said zone and removing an alcohol-rich stream from a lower portion of said second vaporization zone.

2. An improved purification process for the treatment of a crude primary Oxo alcohol having from four to twenty carbon atoms and having sulfur-containing impurities as well as high-boiling impurities which decompose upon the application of heat, which comprises introducing said total crude Oxo alcohol into a primary vaporization zone wherein a bottoms temperature is maintained substantially above the normal boiling point of the alcohol, removing overhead from said vaporization zone a vapor stream rich in Oxo alcohol and essentially free of high-boiling unstable impurities, passing said vapor stream to a hydrogenation zone in which said vapor stream is contacted with hydrogen in the presence of a sulfur-sensitive catalyst at a temperature of from 255° to 350° F., thereby removing substantially all sulfur impurities, passing said purified Oxo alcohol to a second vaporization and fractionation zone in which the temperature is maintained lower than that in the primary vaporization zone, removing volatile material boiling appreciably below the alcohol as an overhead stream from said second vaporization zone, and removing an alcohol-enriched stream from a lower portion of said second vaporization zone.

3. An improved continuous distillation and hydrodesulfurization process for an impure primary, $C_4$–$C_{20}$ Oxo alcohol containing sulfur impurities which produce color bodies in subsequent reactions of the alcohol, which comprises introducing said impure alcohol into a primary stripping column, maintaining the bottoms temperature in said stripping column substantially above the normal boiling point of the alcohol, maintaining continuous reflux within the stripping column, removing an alcohol-rich overhead vapor stream from said stripping column, passing said vapor stream into a hydrogenation and desulfurization zone in which the alcohol is contacted with hydrogen in the presence of a sulfur-sensitive hydrogenation catalyst at a temperature of from 255° to 350° F. whereby substantially all sulfur impurities are removed, passing said purified alcohol together with lower and higher boiling impurities to a secondary column in which the temperatures are maintained lower than those in the primary stripping column, removing as an overhead vapor stream substantially all volatiles boiling below the Oxo alcohol, and removing an alcohol concentrate substantially free of sulfur-containing impurities as a vapor stream from the lower portion of said secondary column.

4. A process according to that described in claim 3 in which the sulfur-sensitive catalyst employed in the hydrogenation and desulfurization zone is a nickel-containing catalyst.

5. A process according to that described in claim 3 in which the Oxo alcohol contains from eight to nine carbon atoms.

6. A continuous purification process for a crude primary $C_8$ Oxo alcohol having sulfur-containing impurities as well as high-boiling heat unstable impurities, which comprises introducing said crude $C_8$ Oxo alcohol into the intermediate portion of a primary stripping column, maintaining the bottoms temperatures in said primary stripping column substantially above the normal boiling point of the $C_8$ Oxo alcohol, whereby substantial amounts of the high-boiling unstable impurities are decomposed to more volatile products, maintaining continuous reflux within the stripping column, removing an alcohol-rich overhead vapor stream from said stripping column, passing said vapor stream into a hydrogenation and desulfurization zone wherein said vapor stream is contacted with hydrogen at a temperature of from 255° to 350° F. in the presence of a sulfur-sensitive catalyst, whereby substantially all sulfur impurities are removed from the alcohol, passing said purified alcohol stream into a secondary column in which the temperatures are maintained substantially lower than those in the primary stripping column, removing as an overhead vapor stream substantially all volatile material boiling below the alcohol and removing a $C_8$ Oxo alcohol concentrate substantially free of sulfur-containing impurities as a vapor side stream from said secondary column.

7. A process according to that described in claim 6 in which the sulfur-sensitive catalyst employed is a nickel-containing catalyst.

8. A process according to that described in claim 7 in which the sulfur-sensitive catalyst is a finely divided nickel hydrogenation catalyst.

References Cited in the file of this patent

UNITED STATES PATENTS

| | | |
|---|---|---|
| 2,068,872 | Rosen et al. | Jan. 26, 1937 |
| 2,099,475 | Giesen et al. | Nov. 16, 1937 |
| 2,105,665 | Lazier et al. | Jan. 18, 1938 |
| 2,464,916 | Adams et al. | Mar. 22, 1949 |
| 2,525,354 | Hoog et al. | Oct. 10, 1950 |
| 2,569,671 | Hughes et al. | Oct. 2, 1951 |
| 2,585,816 | Mertzweiller | Feb. 12, 1952 |
| 2,700,687 | Catterall | Jan. 25, 1955 |